United States Patent [19]

Matsudaira et al.

[11] 4,448,493
[45] May 15, 1984

[54] ELECTROCHROMIC DISPLAY DEVICE

[75] Inventors: Nagahisa Matsudaira, Tokyo; Kaneki Yoshida, Urawa; Kenzo Fukuyoshi, Tokyo; Kiyoshi Masui, Asaka, all of Japan

[73] Assignee: Toppan Printing Co., Ltd., Japan

[21] Appl. No.: 351,953

[22] Filed: Feb. 24, 1982

[30] Foreign Application Priority Data

Feb. 25, 1981 [JP] Japan ................... 56-26358
Jun. 1, 1981 [JP] Japan ................... 56-83969
Jun. 8, 1981 [JP] Japan ................... 56-87760

[51] Int. Cl.³ .................... G02F 1/01; H01G 9/20
[52] U.S. Cl. ........................ 350/357; 252/62.2
[58] Field of Search ........... 350/357; 252/62.2, 600, 252/408.1; 429/191, 193, 207; 204/129.8, 410, 421

[56] References Cited

U.S. PATENT DOCUMENTS

| 3,521,941 | 7/1970 | Deb et al. ................ 350/353 |
| 4,024,036 | 5/1977 | Makamura et al. ........ 429/193 |
| 4,211,475 | 7/1980 | Malugani et al. ......... 350/357 |
| 4,306,774 | 12/1981 | Nicholson .............. 350/357 |
| 4,335,938 | 6/1982 | Giglia et al. ........... 350/357 |

FOREIGN PATENT DOCUMENTS 2006639 8/1970 Fed. Rep. of Germany ..... 252/62.2

Primary Examiner—William H. Punter
Attorney, Agent, or Firm—Lerner, David, Littenberg, Krumholz & Mentlik

[57] ABSTRACT

Disclosed is an electrochromic display device having an electrochromic layer and a solid proton conductive layer between a transparent electrode and a counter electrode. The main component of the solid proton conductive layer is a mixture of at least one of titanic acid, stannic acid, antimonic acid, zirconic acid, niobic acid, tantalic acid and silicic acid. The response time is shortened, the service life is prolonged, and printing may be adopted for formation of cells.

14 Claims, 8 Drawing Figures

ELECTROCHROMIC DISPLAY DEVICE

BACKGROUND OF THE INVENTION

1. Field of the Invention

The present invention relates to an electrochromic display device and, more particularly, to an electrochromic display device which utilizes a solid proton conductive material for an electrolyte and which is formed by printing or application method.

2. Description of the Prior Art

With recent advances in electronics, electrochromic display devices (to be referred to as an ECD for brevity hereinafter) are being studied as digital display elements which operate electrically. An ECD is defined as a display device which utilizes the particular behaviour of some materials according to which the light absorption changes by application of a voltage. Many such materials are known including organic and inorganic materials. However, examples of electrochromic materials (to be referred to as an EC for brevity hereinafter which may be used in consideration of display reliability include organic materials such as viologen derivatives and inorganic materials such as transition metal oxides particularly tungsten oxide and molybdenum oxide. ECDs utilizing liquid electrolyte for the display cells are superior in electrochromic characteristics and are almost in the stage of practical use. However, since they utilize liquid electrolyte, high sealing technics is required, resulting in high cost. For an ECD utilizing a transition metal oxide for an EC layer, it has been proposed to make the overall ECDs solid by combination with an insulation film which is formed by deposition to a thin film of $SiO_2$, $Cr_2O_3$, $CaF_2$, $MgF_2$, $ZnO_2$, $Na$-$\beta$-$Al_2O_3$ or the like. However, such an ECD presents the problems of a low contrast and a relatively slow response. For example, U.S. Pat. Ser. No. 3,521,941 teaches the use of an insulator such as SiO, $CaF_2$, $MgF_2$ or the like for a current carrier permeable insulator such as proton ($H^+$). However, the proposed device has a response time of 30 seconds at 5 to 8 V, which hardly allows practical application. Additionally, the insulation film used in this patent must be made as thin as 0.001 to 1.0 μm. The method for forming such a thin film is limited to the deposition method, and control of the film thickness is difficult.

The coloration of an amorphous tungsten deposited film ($WO_3$ film) when it is used as the EC layer is explained, by Faughnan (Appl. Phys. Lett 26 120 1975) in terms of the double injection of proton and electron as shown below:

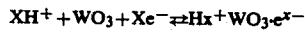

$$XH^+ + WO_3 + Xe^- \rightleftharpoons H_x + WO_3 \cdot e^{x-}$$

ECDs are conventionally known which use display elements of transition metal oxides such as tungsten oxide as the electrochromic material and which combines this display element with an electrolyte having an equivalent concentration of 0.1 such as sulfuric acid. With this ECD, the tungsten oxide EC layer is colored blue upon application of a voltage. For example, as shown in FIG. 1, a thin layer of a transparent electrode 2 is formed over a transparent substrate 1 of a material such as glass in a pattern of display. An EC layer 3 of tungsten oxide or viologen derivative as described above is formed thereover. A counter electrode 6 is arranged in opposition to the laminate body obtained through a light dispersing plate 5. A sealing cover 7 is formed so as to seal the display part in an electrolyte 4, that is, liquid electrolyte.

However, since the liquid electrolyte is used, the cell structure becomes complex owing to the necessity of preventing leakage of the liquid electrolyte. Furthermore, since the EC layer of tungsten oxide or the like dissolves in liquid electrolyte such as sulfuric acid, it is desired to use a solid electrolyte. In consideration of this, Japanese Laid-Open Pat. application No. 12,348/78 proposes an ECD which uses a proton conductive layer of an acid addition salt consisting of hexamethylenetetramine and sulfuric acid. Since this proton conductive layer is in the form of white crystals, a clear display of blue on a white background is obtained when this proton conductive layer is used for the ECD. With this ECD, however, the proton conductivity is low. If the proton conductive layer is made thin in order to obtain faster response, the color of the counter electrode becomes slightly visible. Then, the color density of the background increases, so that the proton conductive layer must be made whiter. In order to achieve clear display, it is conventionally proposed to use a white pigment. For example, Japanese Laid-Open Pat. application No. 99,057/76 proposes addition of titanium oxide ($TiO_2$) to the electrolyte. Titanium oxide is an insulator and has a resistivity of $1 \times 10^8$ Ω·cm. If the resistance is low as in the case of a liquid electrolyte, the addition of titanium oxide does not degrade the response time very much. However, the proton conductive layer consisting of hexamethylenetetramine and sulfuric acid has a low proton conductivity. Thus, the addition of titanium oxide degrades the response time although it improves the clearness of the display.

The above is the state of the field. However, the fact that the electrolyte layer may be formed by a simple method if the cell is totally made of a solid material by use of a proton conductive material as an electrolyte for the ECD still deserves some consideration.

When such an ECD is compared with the liquid ECD, the cell structure becomes simpler and the gap between the electrodes need not be controlled as strictly as for the liquid crystal cells. Therefore, a solid ECD is particularly effective for displaying in a larger area. The problem is too long a response time of the display device due to the low conductivity of the conventional solid electrolyte. A solid electrode of high conductivity has thus been desired.

SUMMARY OF THE INVENTION

In consideration of the problem as presented above, various studies were made for the purpose of improving the whiteness of the background of the display without decreasing the proton conductivity. As a result of such studies, it was found that the whiteness of the background may be improved by white powders selected from the group consisting of titanic acid, stannic acid, zirconic acid, antimonic acid, niobic acid, tantalic acid, silicic acid and mixtures thereof. These materials have good proton conductivities and resistivities as low as $1 \times 10^4$ to $1 \times 10^5$ Ω·cm. The addition of these materials does not degrade the response time of the ECD. On the contrary, the addition of these materials was found to improve the response time and coloration density.

Additionally, a binder which is normally used for printing ink was added in small amounts to each of titanic acid, stannic acid, zirconic acid, antimonic acid, niobic acid, tantalic acid, and silicic acid. The mixture obtained was coated by printing on a transition metal oxide layer of, for example, tungsten oxide. The laminate body thus obtained was dried. The laminate body prepared in this manner was found to be useful as the electrolyte of the ECD, because coloration in blue was obtained in the transition metal oxide layer upon application of a voltage.

The present invention thus provides a solid ECD which uses a solid proton conductive layer. The ECD of the present invention has a high contrast and a high response time of less than 10 seconds, for example, about 1 second at a driving voltage of 2 V or less.

DETAILED DESCRIPTION OF THE PREFERRED EMBODIMENTS

Figure 2:
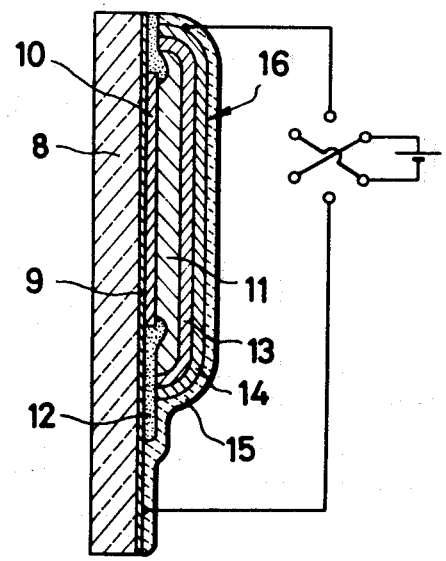
FIG. 2 is a schematic sectional view showing an ECD according to an embodiment of the present invention.

FIG. 2 shows an ECD according to an embodiment of the present invention. Referring to FIG. 2, a transparent electrode 9 of a display pattern such as a character, letter, and figure is formed on a transparent substrate 8 of glass or a synthetic resin. An EC layer 10 as a coloration layer of a transition metal oxide such as tungsten oxide is formed thereover in a pattern. An insulating layer 12 for prevention of current leakage is formed on the non-display area. A proton conductive layer 11 is further formed thereover. The proton conductive layer 11 consists mainly of a mixture of one or more of titanic acid, stannic acid, antimonic acid, zirconic acid, niobic acid, tantalic acid, and silicic acid. Thereafter a counter electrode 16 is formed which consists of a reversible oxidation-reduction material layer 13 and a collector 14 for achieving better electrical conduction. A protective layer 15 of an insulator for protection of these layers from the external environment is formed thereover as needed.

The respective layers of the ECD of the present invention will now be described. The transparent substrate 8 consists of a glass plate, a synthetic resin plate or a synthetic resin film. Since the structure is heated during formation of the transparent electrode 9, heat-resistant glass is generally easy to use. The transparent electrode 9 is formed by deposition to a thin film of indium oxide ($In_2O_3$) or tin oxide ($SnO_2$) on the transparent substrate 8 by thin film formation technique. The transparent electrode 9 is conveniently formed in a pattern corresponding to the shape of display desired. The thin film formation herein used means vacuum deposition, sputtering deposition, ion plating, chemical vapor deposition, thermal decomposition oxidation, or the like. Indium oxide and tin oxide may be used singly or in mixtures of suitable mixing ratios. A small amount of antimony oxide may also be added.

The EC (electrochromic material) layer 10 is a thin film of a transition metal oxide. More specifically, the transition metal oxide may include titanium oxide ($TiO_2$), nickel oxide (NiO or $Ni_2O_3$), cerium oxide ($CeO_2$), vanadium pentoxide ($V_2O_5$), iridium oxide ($Ir_2O_3$), rhodium oxide ($Rh_2O_3$), niobium oxide ($Nb_2O_5$), tantalum oxide ($Ta_2O_5$), chromium oxide ($Cr_2O_3$), molybdenum oxide ($MoO_3$), tungsten oxide ($WO_3$), manganese dioxide ($MnO_2$), rhenium oxide ($Re_2O_7$), osmium oxide ($OsO_4$), cobalt oxide ($Co_2O_3$) or the like. Of all these materials, the use of $WO_3$, $MoO_3$, $TiO_2$, $Ir_2O_3$, $Rh_2O_3$, NiO, $V_2O_5$ or the like is recommended. For example, $WO_3$ and $MoO_3$ allow clear distinction of blue and white (achromatic transparency) and are thus preferable.

The EC layer 10 of such a transition metal oxide is formed on the transparent electrode 9 by the thin film formation technique described above. The vacuum deposition method which adopts electron beam heating is particularly preferable. The thickness of the EC layer 10 must be 0.05 to 2 $\mu$m, preferably 0.2 to 0.5 $\mu$m.

As for the compound used as the main component of the solid proton conductive layer 11, details are not clear although various studies are reported. Titanic acid has the formula $H_4TiO_4$ and an indefinite amount of water is bonded thereto. According to some reports, titanic acid is written as $TiO(OH)_2 \cdot nH_2O$ or $TiO_{(2-x)}(OH)_{2x} \cdot yH_2O$ (where $x>1$). According to another report, three protons are present per 10 titanium atoms.

As stannic acids are known orthostannic acid $H_4SnO_4$, metastannic acid $H_2SnO_3$, hexahydroxostannic acid $H_2[Sn(OH)_6]$. Stannic acid is recently written $SnO_2 \cdot nH_2O$. The bonding strength of water contained in stannic acid continuously varies with temperature. The water is classified into (1) adhesive moisture: this moisture dissociates at a temperature of 200° C. or less, is bonded to the surface or voids and its amount fluctuates according to the preparation method; (2) bound water: it is bonded by hydrogen bonds and dissociates at a temperature of 200° to 400° C.; and (3) constitution water: it dissociates at a temperature of 400° C. or higher.

Hydrated antimony pentoxide ($Sb_2O_5 nH_2O$) is also called antimonic acid and includes orthoantimonic acid ($H_3SbO_4$), metaantimonic acid ($HSbO_3$), pyroantimonic acid or antimony dioxide ($H_4Sb_2O_7$), and antimony trioxide ($H_5Sb_3O_{10}$). When hydrated antimony pentoxide is dried at 50° C., it approximately takes the form of $Sb_2O_5 \cdot 4H_2O$ and within one antimony atom are present one hydroxyl group and one free water molecule. The X-ray diffractiometry reveals that crystalline hydrated antimony pentoxide has a composition of $\{[H_3Sb_3O_5 (OH)_8]\}_3 [H_5Sb_5O_6(OH)_{18}]$ as a unit lattice and has 14 exchangeable hydrogen atoms. Crystalline antimony pentoxide is known to exhibit good proton conductivity of 0.02 $Ohm^{-1}m^{-1}$ at 20° C. Water is bonded to the surface and voids and includes adhaesive water the amount of which fluctuates according to the preparation method, bound water which is bound by hydrogen bonds, and constitution water. The bonding strength continuously changes with temperature. When hydrated antimony pentoxide is dried at 100° C., it has a composition similar to $Sb_2O_5 \cdot H_2O$.

The above description has been made with reference to hydrated antimony pentoxide. However, so-called "antimonic acid" also includes hydrated antimony trioxide which has a oxidation number smaller than 5. Examples of hydrated antimony trioxide include orthoantimonous acid ($H_3SbO_3$ or $Sb_2O_3.3H_2O$), pyroantimonous acid ($H_4Sb_2O_5$ or $Sb_2O_3.2H_2O$), and metaantimonous acid ($H_2Sb_2O_4$ or $Sb_2O_3.H_2O$).

With hydrated antimony trioxide, the bonding strength of water continuously changes with temperature as in the case of hydrated antimony pentoxide. Oxides of antimony include, in addition to antimony pentoxide and antimony trioxide, antimony tetroxide ($Sb_2O_4$) and intermediate oxide ($Sb_6O_{13}$) which have oxidation numbers smaller than 5. Hydrate compounds of these may also exist.

When an antimonic acid is used as the main component of the proton conductive layer 11, the layer 11 exhibits some interesting behaviour. For example, when a mixture of an antimonic acid having an oxidation number of 5 such as antimony pentoxide ($Sb_2O_5.nH_2O$) and an antimonic acid having an oxidation number of less than 5 such as hydrated antimonic acid ($Sb_2O_3.nH_2O$) is used as the main component of the proton conductive layer 11, a clear display of high contrast, a short response time, excellent coloration density, and long repeated-use service life is obtained.

Although the reason for this is not clear, it is considered that antimonic acids such as antimony trioxide ($Sb_2O_3$), antimony tetroxide ($Sb_2O_4$) and an intermediate antimony oxide ($Sb_6O_{13}$) which are in a reduced state as compared to antimony pentoxide, reversibly change to the oxidized state, and function as electron donors of proton ($H^+$) and as anode electrodes upon application of a voltage.

Zirconic acid has the formula $Zr(OH)_4.nH_2O$ and can be regarded as an acid according to the general properties of hydroxides of the group IV elements. However, zirconic acid has fewer properties as an acid. Tantalic acid has a formula $HTaO_3$. When an indefinite amount of water is bonded to tantalic acid, it is written as $Ta_2O_5.nH_2O$. Niobic acid has a formula $Nb_2O_5.nH_2O$.

Silicic acid includes orthosilicic acid $H_4SiO_4$, metasilicic acid $H_2SiO_3$, mesobissilicic acid $H_3Si_2O_5$, mesotrisilicic acid $H_4Si_3O_8$, and mesotetrasilicic acid $H_6Si_4O_4$. However, it is difficult to correctly obtain silicic acid of these compositions, which exist in the form of white powders. All the compounds described above may be easily obtained in the form of a white powders.

Titanic acid, stannic acid, antimonic acid, zirconic acid, tantalic acid, niobic acid, and silicic acid are in the form of hydrated compounds. In these hydrated compounds, water is chemically bonded and they become proton conductive materials covered by water. These hydrated compounds have the properties of acids. However, these acids do not corrode transition metal oxides and can be effectively used as electrolytes for the ECDs. These acids therefore differ from mere mixtures of titanium oxide, tin oxide, antimony oxide, zirconium oxide, tantalum oxide, and niobium oxide with water.

The main components of the proton conductive layer 11 as described above are in the layered form. Although these main components are available in the form of white powders, they may be provided in the form of plates prepared by press forming. However, it is preferable to form a thin film by application or printing and to dry and cure the thin film so as to obtain the conductive layer. Irrespective of which measure is taken to form the conductive layer, the thickness of the solid proton conductive layer 11 may be determined to be within a relatively wide range. More specifically, the thickness is 2 to 2,000 μm and preferably 50 to 400 μm.

The particular means for obtaining the solid proton conductive layer 11 by application or printing, that is, ink milling will now be described. The main components of the solid proton conductive layer 11 are obtained in the form of powders. However, in order to improve the contact state between the powders and the solidity as an applied film, the powder may be mixed with a volatile solvent and a binder such as polyhydric alcohol or polymer resin binder. The mixture is well milled. The obtained mixture is printed and dried to obtain a solid proton conductive layer on the EC layer.

Polyhydric alcohol is used in a certain amount; it is used within 0.5 to 30% by weight, particularly, 5 to 20% by weight based on a weight of the main components of the proton conductive layer. In one embodiment, the polyhydric alcohol has a evaporation pressure of not higher than 0.1 mm Hg. at 20° C. and is a liquid phase in the ordinary form. When the amount of polyhydric alcohol is outside this range, the conductivity decreases and the film strength is degraded, resulting in undesirable effects. Examples of polyhydric alcohol may preferably include glycols or glycerin, diglycerin represented by the general formula:

$$HO(R-O)_nH$$

(where R is an alkylene group having 2 to 10 carbon numbers, and n is an integer of 1 or more, n being selected so that the polyhydric alcohol is in the ordinary state).

Suitable examples of glycol include ethylene glycol, diethylene glycol, triethylene glycol, tetraethylene glycol, polyethylene glycol (where n is 5 or more, 400 or less in molecular weight), propylene glycol, dipropylene glycol, polypropylene glycol (where n is 3 or more, and 400 or less in molecular weight), butylene-1,4-glycol, hexylene glycol, octylene glycol, and so on. Polyhydric alcohol which is solid in the ordinary state does not improve the conductivity under low humidity. Examples of such polyhydric alcohols include pentaerythritol, mannitol, sorbitol, glycose.

To the electrolyte whose conductivity is improved in this manner is added a binder and a volatile solvent for ink milling the mixture. This binder may be a water-soluble polymer. Examples of polymers include various types of starches, cyanoethylated starch, methyl cellulose, ethyl cellulose, hydroxyethyl cellulose, carboxymethyl cellulose, tragacanth gum, acacia, glue, casein, gelatin, sodium alginate, polyvinyl alcohol, partially saponified vinyl acetate, partially acetylated polyvinyl alcohol, polyvinylmethyl ether, polyvinyl pyrrolidone, polyacrylamide, water-soluble acrylic resin, and so on. Aqueous emulsion-type polymers may also be used as the binder. Especially, carboxyl group-containing polymers and sulfonic group-containing polymers exhibit good results.

As resins which contain carboxylic groups (—COOH) and sulfonic groups (—SO$_3$H), ion-exchange resins may be available. The ion-exchange resins are synthetic resins which have three-dimensional network structures. In the ion-exchange resins, fixed ions which are immobile and movable ions which are mobile are bonded to parts of the structure so as to maintain electric neutrality. Water of hydration surrounds these fixed and movable ions. The fixed ions which are immobile are the exchange groups which perform ion exchange. The ion-exchange resins which have the carboxylic group or the sulfonic group are cation-exchange resins and may be expressed by the general formula R-COOH or R-SO$_3$H. These cation-exchange resins dissociate in water as follows:

The resins of the R-COOH type are weakly acidic such as acetic acid and are called weakly acidic cation-exchange resins. The resins of the R-SO$_3$H type are easy to dissociate and strongly acidic such as hydrochloric acid or sulfuric acid. These resins are called strongly acidic cation-exchange resins.

The dissociated protons are considered to move and render good conductivity upon application of a voltage.

However, the commercially available ion-exchange resins have three-dimensional network structures due to the presence of a cross-linking agent. Therefore, these ion-exchange resins do not dissolve but swell in water and are not suitable as a binder. The resin binders which are suitable for the purpose of the present invention are those which have the proper properties as the binders such as those prepared by linear polymerization. More specifically, examples of such resin binders may include linear polymers such as polystyrene, polyvinyl toluene, and polyacrylamide; and copolymers and modified polymers having these as straight chains. By adding a sulfonic acid group to one of these polymers, a high-polymeric binder is obtained which is soluble in a water.

The volatile solvent is added so as to improve the fluidity of the ink. A water-soluble solvent is preferable for use with the proton conductive material of the present invention. Thus, good examples of solvents include water or water-soluble solvents such as lower alcohols or lower ketones. After printing or application, these solvents may be removed by evaporation by drying.

The insulating layer 12 is preferably made of a transparent insulating resin as a main component. Although a colorant may be added to the insulating layer 12, the main component thereof is preferably a curable resin which does not contain a solvent such as an oxidative polymerizable resin, an ultraviolet curable resin, a cross-linking polymerizable resin. More preferably, the main component of the insulating layer 12 is a resin which is suitable for printing or application. Almost the same applies to the protective layer 15. Referring to the protective layer 15, a material for the protective layer 15 is preferably a curable resin which is suitable for printing or application and which does not contain a solvent. Of course, the protective layer 15 of the selected material must be able to shield the moisture in the air and must be resistant to external forces to a certain extent. Better results are obtained when an epoxy resin of a cross-linking curable type or a catalyst curable type is used.

Among the layers described above, the insulating layer 12 and the protective layer 15 are not the essential elements of the ECD of the present invention. Therefore, the ECD is not rendered inoperable by the absence of these layers. However, if the surface of the ECD is pattered in the form of characters, numbers or figures, it is preferable to form the insulating layer 12 in order to prevent the leakage of current. It is also better to form the protective layer 15 so as to improve the durability or mechanical strength of the ECD.

The above also applies to the case when the reversible oxidation-reduction material layer 13 is formed at part of the opposing electrode 16 to be described below.

Further improvements in the response time and the repeated-use characteristics (service life) may be obtained if the reversible oxidation-reduction material layer 13 is used for the counter electrode 16 of the ECD of the present invention. The reversible oxidation-reduction material layer 13 may also be formed by ink milling the raw material and printing on the proton conductive layer 11. As a result, an ECD of simple structure may be obtained.

The composition of the ink for forming the reversible oxidation-reduction material layer 13 on the solid proton conductive layer 11 consists of a carbon powder, a synthetic resin binder, a reversible oxidation-reduction material, a volatile solvent, and additives for facilitating printing. Examples of the carbon powder may include carbon black such as quetien black, acetylene black and conductive furnace black; and carbon fiber.

The binder may be an acrylic resin, a vinyl chloride resin, an epoxy resin, a melamine resin, a quanamine resin, an alkyd resin, a metacrylic resin, or the like. Examples of the reversible oxidation-reduction material as the main component may include oxides or sulfides of metals such as titanium dioxide, nickel dioxide, cobalt oxide, iron oxide, silicon dioxide, zinc oxide, cupper oxide (CuO), ion sulfide (FeS, FeS$_2$), bismuth oxide (Bi$_2$O$_3$), niobium sulfide or the like; or hydroquinone derivatives or berlin acid, berlinate derivatives disclosed in Japanese Laid-Open Pat. Application No. 17,115/80 and No. 69,127/80.

A volatile solvent must have a high boiling point so that the solvent may not evaporate during the printing step such as in screen process printing. The addition of the volatile solvent must not change the properties of the ink. The solvent preferably evaporates fast after printing. The solvent must have a boiling point within a range of 150° to 270° C. and preferably within a range of 200° to 250° C. The solvent must be a good solvent of the binder. Examples of such solvents may include diethylene glycol monoethyl ether acetate, diethylene glycol monobutyl ether acetate, tripropylene glycol monomethyl ether, diethylene glycol monobutyl ether, 2-phenoxy ethanol, 2-hexyloxy ethanol, N-methylpyrrolidone, and 2-pyrrolidone.

It is also possible to add as an additive a surface active agent in order to facilitate printing or application.

The coloration response is improved by forming on the reversible oxidation-reduction material layer 13 a collector 14 which is formed by preparing an ink of a metal powder as a conductive filler, a synthetic resin binder and a volatile solvent and applying and drying the ink. Due to the low conductivity of the reversible oxidation-reduction material layer 13, a voltage drop occurs if the collector 14 is not formed. By forming the collector 14 as the counter electrode 16, the voltage drop is prevented and the response time is improved. The metal powder may be a powder of Ag, Pd, Ni, Cu or the like.

Figure 1:
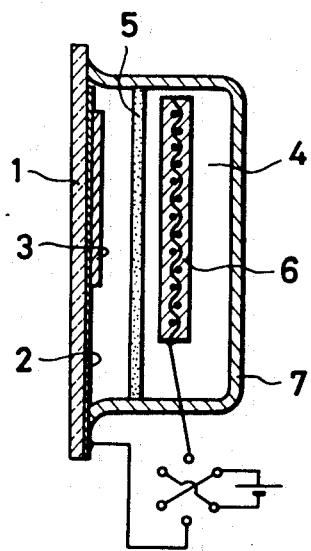
FIG. 1 is a schematic sectional view of an example of a conventional ECD using a liquid electrolyte.

According to the ECD of the present invention, as compared with a conventional ECD as shown in FIG. 1, sealed cells or the like are not required since the liquid electrolyte is not used. Therefore, the material of the counter electrode, especially, the reversible oxidation-reduction material may be dissolved during conduction, so that the display may be stabilized and the service life of the ECD may be improved. In particular, the counter electrode of the present invention may be formed by applying the ink in a coat. Therefore, the formation of the counter electrode is significantly easier than that for the conventional ECD using the liquid electrolyte.

If the counter electrode is made of a reversible oxidation-reduction material in the ECD including a proton conductive layer in place of the liquid electrolyte as shown in FIG. 2, the time required for coloration or bleaching, the response time, is reduced to ¼ to 1/5 that required for an ECD which does not use such a reversible oxidation-reduction material for the opposing electrode. In other words, when the reversible oxidation-reduction material is used, the reaction overvoltage contacting the solid proton conductive layer 11 and the reversible oxidation-reduction layer 13 is very small. Although the cause of this is not clear, the following is a surmise. The solid proton conductive layer is porous in the dried solid state. When a reversible oxidation-reduction material layer is formed thereon by printing or application, the reversible oxidation-reduction material permeates into the surface layer of the solid proton conductive layer, increasing the area of contact. As a result, it is considered that an electrically good contact interface is formed between the two layers. Due to the contact between the liquid phase and the solid phase, subreaction (breakdown) may occur between the solid proton conductive layer 11 and the reversible oxidation-reduction layer 13, so that the repeated-use characteristics are improved. In fact, irregular coloration is not caused, and the number of repeated colorations or bleachings (service life of the ECD) increases to about ten times that of the conventional ECD. Thus, the ECD of the present invention is easy to manufacture and is excellent in performance.

A transition metal oxide such as tungsten oxide or molybdenum oxide which is used for the EC layer 10 turns from no color to blue upon application of a voltage. Therefore, the user will be able to observe the difference between the white color of the solid proton conductive layer and the blue color of the electrochromic material.

However, the display in white and blue as described above is only the basic feature of the present invention. It is possible to attain multicolor display by adding third and/or fourth colors to white and blue. This may be easily accomplished by not modifying the material of the EC layer and adding a colorant to other layers, such as one or both of the solid proton conductive layer 11 and the insulating layer 12. As has been described above, the solid proton conductive layer 11 and the insulating layer 12 can be formed by printing such as screen process printing. Therefore, by adding a suitable amount of a colorant to the ink for forming these layers, it is possible to color the non-display part of the ECD or to color the background of the nonchanging part of the non-display so that the color of the background may be observed when the EC layer 10 becomes transparent.

The colorant added to the material of the insulating layer 12 must not affect the insulating effect of the layer. The colorant added to the proton conductive layer 11 must not adversely affect the proton conductivity of the layer and must not shorten the service life of the ECD.

For example, a conductor such as carbon black may not be added to the insulating layer 12 since it degrades the insulating effect of the layer. If a colorant such as Acid red 6 or Rhodamine B is added to the proton conductive layer 11, the conductivity of the proton conductive layer 11 is degraded. Furthermore, after the formation of the cells, the test of repeated coloration and bleaching results in abnormality at the edge of the ECD and shortens the service life.

In general, when pigments or dyes which do not affect (e.g., dissolve) the solvent or binder are used in the ink, the conductivity is rarely affected and the service life (repeated coloration and bleaching) is not adversely affected.

The reason for this is not clear. However, when an ink is prepared by adding a material soluble in the volatile solvent or binder of the solid proton conductive layer and is printed and dried, this material precipitates on the surfaces of the proton solid conductive material particles such as titanic acid, stannic acid or antimonic acid, and the colorant itself becomes involved in a chemical reaction upon application of a voltage. The amount of the colorant to be added to either the proton conductive layer or the insulating layer is 0.01 to 10% by weight and preferably 0.1 to 1% by weight based on the total solid content.

Figure 7:
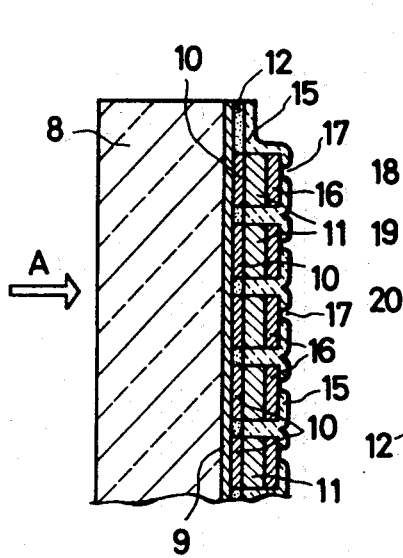
FIG. 7 is a sectional view showing an example of an ECD in which an EC layer and an solid proton conductive layer are printed in a matrix pattern.

The ECD of the present invention can also perform a display in a matrix form. As has been described above, according to the ECD of the present invention, the insulating layer 12, the reversible oxidation-reduction layer 13 and the collector 14 as well as the solid proton conductive layer 11 can be formed by printing. It follows from this that the display in the matrix form can be easily accomplished. More specifically, as shown in FIG. 7, after forming the transparent electrode 9 and the EC layers 10 in the order named on the transparent substrate 8, the insulating layer 12 is formed in a lattice form to fill the gap between the electrode 9 and the EC layers 10. A number of solid proton conductive layers 11 of matrix pattern and counter electrodes 16 (may comprise reversible oxidation-reduction layers 13 and the collectors 14 as needed) superposed on the solid proton conductive layers 11 are printed using predetermined inks. It is, of course, recommended to form the protective layer 15 which covers the entire surface excluding terminal portions 17.

Figure 8:
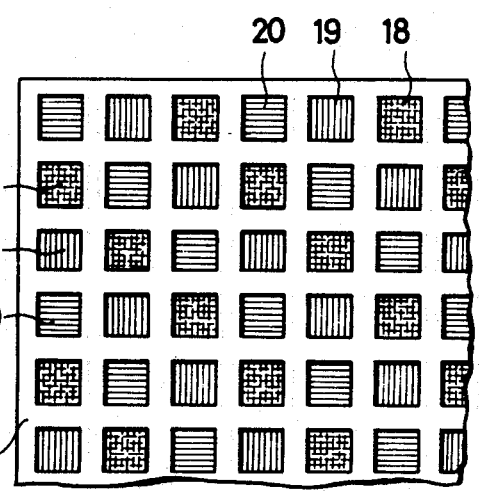
FIG. 8 is a plan view of the ECD shown in FIG. 7 as viewed in the direction A.

In the electrodes of the matrix-type ECD shown in FIGS. 7 and 8, picture elements which are respectively separated in a matrix pattern are used in order to prevent cross effects. In order to color or bleach (drive) the ECD, it is possible to separately drive one or both of the transparent electrodes 9 and the counter electrodes 16 in correspondence with the respective picture elements. Alternatively, it is also possible to arrange a plurality of transparent electrodes 9 in the transverse direction and to arrange a plurality of counter electrodes in the vertical direction to sandwich the EC layers 10 and the solid proton conductive layers 11, thus accomplishing an X-Y coordinate electrode matrix. With the latter arrangement, if no special measure is taken, the cross effects are caused. This may adversely affect the picture elements near the driven picture elements and slight coloration may occur. In order to prevent the cross effects in the X-Y coordinate electrode matrix, it is effective to establish a certain threshold voltage for the ECD so that the picture elements may color at a predetermined voltage and may not color at voltages less than this predetermined voltage. In order to establish such a threshold voltage, a material which has such a threshold voltage is used for the EC layer or the solid proton conductive layer. Thus, a layer which has a threshold voltage is incorporated. Alternatively, it is possible to add a rectifying element such as a varister between the picture elements or to correct at the driver circuit. The present invention is not particularly limited to any of these methods.

An example of color display of the ECD of the present invention will be described in Example 4. An example of the matrix display will be described in Example 6. However, it is possible to combine both the color display and the matrix display in one ECD.

The present invention will now be described by way of examples.

EXAMPLE 1

A transparent electrode and a tungsten oxide layer were formed on a glass substrate. An insulating layer was formed on the non-display area from an epoxy-type synthetic resin enamel (trade name: SS-25000, manufactured by TOYO INK MFG. CO., LTD.) by screen process printing. A pressed layer of metastannic acid (ignition loss: 15%, manufactured by Mitsuwa Chemical K.K.) of 1 mm thickness was sandwiched between the insulating layer and a counter electrode layer of molybdenum plate. The layer of metastannic acid provided the proton conductive layer, thus completing an ECD. The coloration density delta optical density became 0.4 after electric conduction for 10 seconds of 1.3 V. The blue display obtained at this time was clear and easy to see since it was on a white background (metastannic acid).

EXAMPLE 2

A transparent electrode of indium oxide was patterned on a glass substrate. Tungsten oxide was vacuum-deposited thereover to a thickness of about 0.4 $\mu$m by the electron beam heating method. An insulating layer of an epoxy-type synthetic resin enamel (trade name: SS-25000, manufactured by TOYO INK MFG. CO., LTD.) was formed at the non-display part by screen process printing.

An ink was prepared from 6 parts of $0.7Sb_2O_5.0.3Sb_2O_3.nH_2O$ (where n=1), 1 part of a glycerin of polyhydric alcohol, 1 part of water, and 0.2 part of vinyl acetate emultion (trade name: Polysol S-400, manufactured by Showa Kobunshi K.K.) as a binder. The ink was then applied and dried at 60° C. for 2 hours to form a solid proton conductive layer of 200 $\mu$ thickness. The electrolyte was solidified after drying.

An ink was prepared which contained, in a mixing ratio of 0.6 : 1 : 1 : 4 based on weight, Prussian blue (trade name: Konjyo AF, manufactured by Dainichi Seika K.K.), a phenol modified xylene resin, quetin black, and diethylene glycol monobutyl ether. The ink for forming a reversible oxidation-reduction layer was printed on the solid proton conductive layer and dried. An Ag-type conductive paste (trade name: Dotite D-550, manufactured by Fujikura Kasei K.K.) was printed on the reversible oxidation-reduction layer to form a collector.

A coloration density of 0.5 was obtained in 1.5 seconds after application of a voltage of 1.3 V. This coloration persisted for 24 or more hours. When a voltage of opposite polarity was applied, the coloration disappeared, the present ECD withstood the coloration and bleaching $1 \times 10^7$ times or more. This ECD exhibited a response time which was shorter than that obtained with an ECD which had a proton conductive layer consisting totally of hydrated antimony pentoxide which did not contain hydrated antimony trioxide. The service life was also longer.

EXAMPLE 3

As shown in FIG. 2, a transparent electrode 9 of indium oxide was formed on a transparent substrate 8 of glass. An EC layer 10 of tungsten oxide was formed thereover to a thickness of about 0.5 $\mu$m by vacuum deposition utilizing electron beam heating.

An insulating layer 12 of an epoxy-type synthetic resin enamel (trade name: SS-25000, manufactured by TOYO INK MFG. CO., LTD.) was formed on the non-display part.

An ink with a mixing ratio of 6 : 1 : 0.2 : 1 based on weight was prepared from metastannic acid (ignition loss 15%, manufactured by Mitsuwa Chemical K.K.), glycerin, a binder (a styrene-acrylic copolymer emulsion; trade name: Tokuril K-70, manufactured by TOYO INK MFG. CO., LTD.), and water. The ink was printed on the entire surface by screen process printing. The printed ink was then dried at 60° C. for 30 minutes to provide a proton conductive layer 11. An ink with a mixing ratio of 0.3 : 1 : 1 : 3 based on weight was prepared from a powdered phenol modified xylene resin, tri-iron tetroxide, acetylene black, and diethylene glycol monoethyl ether acetate. The ink was printed by screen process printing, and the printed ink was dried at 60° C. for 30 minutes to provide a reversible oxidation-reduction material layer 13. An Ag conductive paste (trade name: Dotite XA-167, manufactured by Fujikura Kasei K.K.) was applied to provide a collector 14. The ECD was thus completed. Excellent coloration and bleaching were observed when a voltage of ±1.3 V was applied for 1 second. The voltage to be applied was smaller, and time required to achieve coloration (response time) was shortened as compared to an ECD which did not involve tri-iron tetroxide.

EXAMPLE 4

Figure 4:
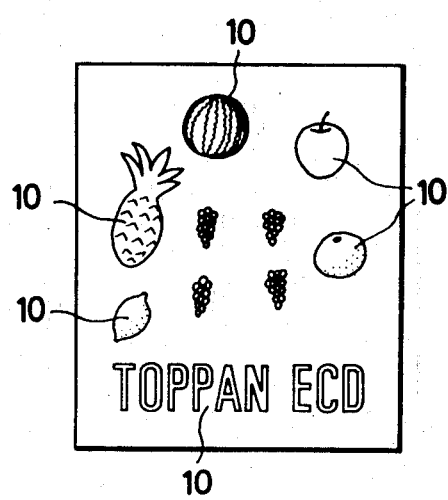
FIG. 4 is a plan view showing an example of the pattern of an EC layer as a constituting element of the ECD of the present invention.
Figure 3:
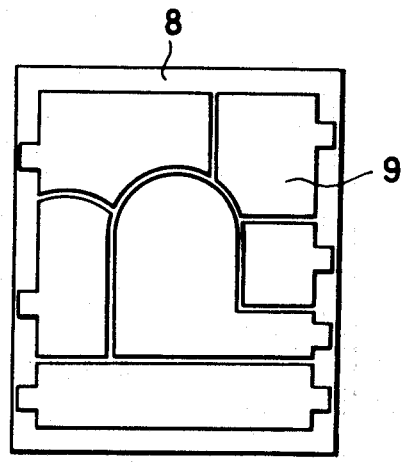
FIG. 3 is a plan view showing an example of a transparent electrode of the embodiment shown in FIG. 2.
Figure 5:
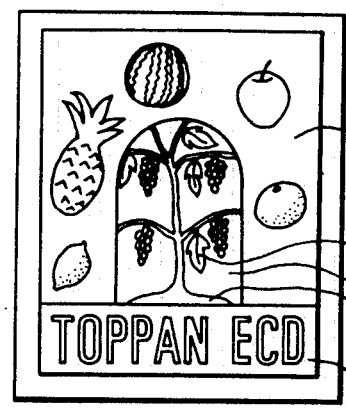
FIG. 5 is a plan view showing an example of the pattern of a colored insulation film which is also a constituting element of the ECD of the present invention.
Figure 6:
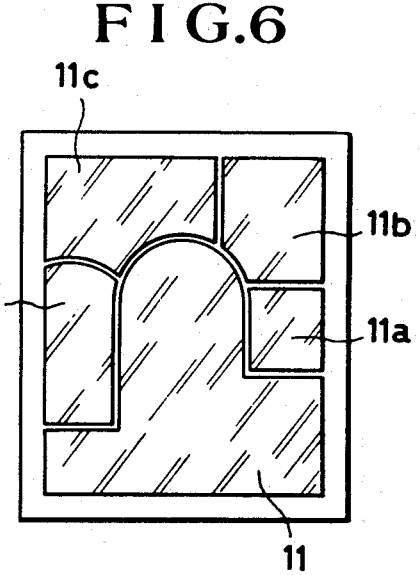
FIG. 6 is a plan view of an example of the pattern of a colored solid proton conductive layer which is a constituting element of the ECD of the present invention.

A transparent electrode 9 of indium oxide was formed on a transparent substrate 8 of glass as shown in FIG. 3. Tungsten oxide was deposited in a pattern as shown in FIG. 4 by the electron beam deposition method to provide an EC layer 10. An insulating layer 12 of the pattern as shown in FIG. 5 was formed thereover by screen process printing. Then, by screen process printing were formed, in the pattern as shown in FIG. 5, a blue insulating layer 12, a green insulating layer 12a, a brown insulating layer 12b, a transparent insulating layer 12c and a pink insulating layer 12d. For the transparent part, Medium SS-25000, manufactured by TOYO INK MFG. CO., LTD. was used. For the other parts, SS25-515, SS25-262, and SS25-391 manufactured, by TOYO INK MFG. CO., LTD. were used which were mixtures of pigments with SS-25000 available from the same company. After curing these layers, a proton conductive layer ink was prepared from 6 parts of $0.7Sb_2O_3.0.3Sb_2O_5.nH_2O$ (where n=1), 1 part of glycerin, 1 part of water, and 0.2 part of vinyl acetate emulsion (trade name: Polysol S-400, manufactured by Showa Kobunshi K.K.). The ink was printed in the pattern of the proton conductive layer 11 as shown in FIG. 6 by screen process printing. Proton conductive layers 11a (orange), 11b (red), 11c (green), and 11d (yellow) were formed from the proton conductive inks which were prepared by mixing the proton conductive ink as described above with pigments (trade names: Chromarine toners, M35, Y2, RT6 and GT4, manufactured by Du Pont, U.S.A.). An ink with a mixing ratio of 0.3 : 1 : 1 : 4 based on weight was prepared from tri-iron tetroxide, a phenol modified xylene resin, acetylene black, and diethylene glycol monobutyl ether. The ink was printed on the proton conductive layers 11, 11a, 11b, and 11c to provide a reversible oxidation-reduction layer 13 as shown in FIG. 2. A conductive paste (trade name: Dotite XA-167, manufactured by Fujikura Kasei K.K.) was printed thereover to provide a collector 14 as a counter electrode. An epoxy resin (trade name: Araldyte standard, manufactured by Nagase Chiba K.K.) was deposited thereover to provide a protective layer 15 which was cured thereafter. An ECD was thus completed.

When a voltage of ±1.3 V was applied to this ECD, patterns of a lemon, pineapple, water melon, apple, and orange were colored in yellow, yellow, green, red and orange, respectively, in the blue background. Grapes could not be observed.

When a voltage of −1.3 V was applied, patterns of a lemon, pineapple, water melon, apple, and orange disappeared and a pattern of grapes in blue was observed.

According to the present invention, as seen from this example, multicolor display may be performed in place of two-tone display of white and blue.

EXAMPLE 5

A transparent electrode of indium oxide was formed in a pattern on a transparent substrate of glass. Tungsten oxide was then deposited thereover to a thickness of about 0.4 $\mu$m by vacuum deposition utilizing electron beam heating. An epoxy-type synthetic resin enamel (trade name: SS-25000, manufactured by TOYO INK MFG. CO., LTD.) was printed by screen process printing on the non-display part to provide an insulating layer. An ink was prepared from 5 parts of $0.9Sb_2O_5.0.1Sb_2O_3.nH_2O$ (where $n\approx2.5$), 1 part of glycerin, 0.5 part of water, and 1 part of vinyl acetate emulsion (trade name: Polysol S-400, manufactured by Showa Kobunshi K.K.) as a binder. Another ink was prepared from 5 parts of $0.9Sb_2O_5.0.1Sb_2O_3.nH_2O$ ($n\approx2.5$), 1 part of glycerin, 0.5 part of water, and 1 part of 50% solution in sulfonic acid of oligostyrene containing the sulfonic acid group (trade name: Oligo Z, manufactured by Tomoegawa Paper CO. LTD.). These inks were printed by screen process printing and dried at 40° C. for 2 hours to provide solid proton conductive layers. Then, a mixture of 10 parts of a carbon-type conductive paste (trade name: Dotite XC-74, manufactured by Fujikura Kasei K.K.) with 3 parts of Prussian blue was printed by screen process to form a reversible oxidation-reduction material layer. An Ag-type conductive paste (trade name: Dotite, manufactured by Fujikura Kasei K.K.) was printed by screen process and dried to form a collector. When a voltage of 1.3 V was applied to the ECD thus obtained, it took 3 seconds for the ECD to provide a coloration density of 0.5 when the vinyl acetate emulsion was used as the binder. With an ECD which used a sulfonic acid of oligostyrene, it took only 1 second for obtaining a coloration density of 0.5. Significant changes were not observed with the ECD which used a sulfonic acid of oligostyrene as the binder after repeated use of $5\times10^6$ times.

EXAMPLE 6

As shown in FIG. 7, a transparent electrode of indium oxide containing 5% of tin oxide was formed on one surface of a transparent substrate 8 of glass to provide a display transparent electrode 9. Tungsten oxide ($WO_3$) was deposited in a matrix pattern thereover to provide EC layers 10. An insulating layer 12 of an epoxy-type screen ink (trade name: SS25-391, manufactured by TOYO INK MFG., CO., LTD.) was formed on the non-display part. An ink with a mixing ratio of 4 : 1 of metastannic acid (manufactured by Mitsuwa Kagaku Yakuhin K.K.) with glycerin was printed to a thickness of about 200 $\mu$ by screen process printing to provide proton conductive layers 11. Yellow picture elements 18, magenta picture elements 19, and cyan picture elements 20 were printed by printing a yellow ink, a magenta ink and a cyan ink, respectively, which were prepared by adding 2 to 0.5% of organic pigments (Chromarine toners, manufactured by Du Pont, U.S.A.) A conductive paste (trade name: Dotite D-550, manufactured by Fujikura Kasei K.K.) was printed to form opposing electrodes 16 on the proton conductive layers 11 by screen process printing. A protective layer 15 of an epoxy resin was printed excluding terminal portions 17 for connecting with electrodes. A multicolor display ECD was thus obtained. When a voltage of 1.3 V was applied using the picture elements 19 as a cathode and all the opposing electrodes 16 as anodes to allow coloration of all the picture elements (all the EC layers) in blue, the ECD became blackish. When a voltage of opposite polarity was applied to bleach the EC layers of the yellow picture elements 18 alone, the corresponding proton conductive layers 11 at the background were observed and the ECD appeared yellow. When the EC layers of magenta picture elements 19 were bleached, the magenta color at the background was observed. By a similar operation, the cyan color was observed for the cyan picture elements 20. By selectively coloring picture elements, multicolor display of characters, graphs, moving pictures or the like could be performed.

What is claimed is:

1. An electrochromic display device having at least an electrochromic layer containing a transition metal oxide and a solid proton conductive layer disposed between a transparent electrode and a counter electrode, characterized in that a main component of said solid proton conductive layer is a member selected from the group consisting of titanic acid, stannic acid, antimonic acid, zirconic acid, niobic acid, tantalic acid, silicic acid and mixtures thereof.

2. An electrochromic display device according to claim 1, wherein said solid proton conductive layer contains 0.5 to 30% by weight, based on a weight of the main component of said proton conductive layer, of a polyhydric alcohol which has an evaporation pressure of not higher than 0.1 mmHg at 20° C. and which is in liquid phase in the ordinary form.

3. An electrochromic display device according to claim 1, wherein said solid proton conductive layer contains a carboxyl group-containing polymer of aqueous emulsion type as a binder.

4. An electrochromic display device according to claim 1, wherein said solid proton conductive layer contains a sulfonic acid group-containing polymer of water-soluble type as a binder.

5. An electrochromic display device according to claim 1, wherein said solid proton conductive layer contains as the main component a mixture of an antimonic acid having an oxidation number of 5 and an antimonic acid having an oxidation number of less than 5.

6. An electrochromic display device according to claim 1, wherein said solid proton conductive layer is formed by printing or applying and drying an ink which contains, as the main component, a member selected from the group consisting of titanic acid, stannic acid, antimonic acid, zirconic acid, niobic acid, tantalic acid, silicic acid, and mixtures thereof; a binder comprising a polyhydric alcohol and/or a water-soluble polymer or an aqueous emulsion type polymer; and a volatile solvent.

7. An electrochromic display device according to claim 1, wherein said counter electrode is of two-layered structure consisting of a reversible oxidation-reduction material layer and a collector.

8. An electrochromic display device according to claims 1 or 7, wherein said reversible oxidation-reduction material layer of said counter electrode consists of a carbon powder as a conductive filler, a synthetic resin binder and a reversible oxidation-reduction material; and said reversible oxidation-reduction material layer is formed by printing or applying next to said solid proton conductive layer.

9. An electrochromic display device having at least an electrochromic layer containing a transition metal oxide and a solid proton conductive layer interposed between a transparent electrode and a counter electrode, characterized in that a main component of said solid proton conductive layer is a member selected from the group consisting of titanic acid, stannic acid, antimonic acid, zirconic acid, niobic acid, tantalic acid, silicic acid, and mixtures thereof; said electrochromic layer is formed partially according to a display pattern; and an insulating layer is formed at a non-display part at which said electrochromic layer is not formed.

10. An electrochromic display device according to claim 9, wherein said insulating layer contains a colorant.

11. An electrochromic display device according to claim 9, wherein said solid proton conductive layer contains a colorant.

12. An electrochromic display device having at least an electrochromic layer containing a transition metal oxide and a solid proton conductive layer disposed between a transparent electrode and a counter electrode, characterized in that a main component of said solid proton conductive layer is a member selected from the group consisting of titanic acid, stannic acid, antimonic acid, zirconic acid, niobic acid, tantalic acid, silicic acid, and mixtures thereof; and at least one of said transparent electrode and said counter electrode is formed in a matrix pattern for performing matrix display.

13. An electrochromic display device according to claim 12, wherein said electrochromic layers and said solid proton conductive layers are formed in a matrix form in correspondence with said electrode formed in a matrix form.

14. An electrochromic display device having at least an electrochromic layer containing a transition metal oxide and a solid proton conductive layer disposed between a transparent electrode and a counter electrode, characterized in that a main component of said solid proton conductive layer is a member selected from the group consisting of titanic acid, stannic acid, antimonic acid, zirconic acid, niobic acid, tantalic acid, silicic acid, and mixtures thereof; and said transparent electrode and said counter electrode are formed in an X-Y coordinate pattern for matrix display.

* * * * *